(12) United States Patent
Borelli et al.

(10) Patent No.: US 7,917,394 B2
(45) Date of Patent: Mar. 29, 2011

(54) SYSTEM AND METHOD FOR PROVIDING ACCESS TO NETWORK SERVICES

(75) Inventors: Steven J. Borelli, Highlands Ranch, CO (US); Sally E. Else, Denver, CO (US); Patrick C. Davies, Sandy, UT (US); Ranbir Chawla, Littleton, CO (US); Randall W. Cardinal, Bountiful, UT (US)

(73) Assignee: CSG Systems, Inc., Englewood, CO (US)

( * ) Notice: Subject to any disclaimer, the term of this patent is extended or adjusted under 35 U.S.C. 154(b) by 2454 days.

(21) Appl. No.: 09/992,379

(22) Filed: Nov. 19, 2001

(65) Prior Publication Data

US 2006/0020525 A1    Jan. 26, 2006

(51) Int. Cl.
*G06Q 30/00* (2006.01)
(52) U.S. Cl. .............................. 705/26; 705/27; 705/34
(58) Field of Classification Search .................. 705/26, 705/27, 34
See application file for complete search history.

(56) References Cited

U.S. PATENT DOCUMENTS

| | | | | |
|---|---|---|---|---|
| 4,872,158 | A | 10/1989 | Richards | |
| 5,987,480 | A * | 11/1999 | Donohue et al. | 707/501 |
| 6,061,665 | A * | 5/2000 | Bahreman | 705/40 |
| 6,182,054 | B1 | 1/2001 | Dickinson et al. | |
| 6,418,441 | B1 * | 7/2002 | Call | 707/10 |
| 6,567,850 | B1 * | 5/2003 | Freishtat et al. | 709/224 |

* cited by examiner

*Primary Examiner* — F. Zeender
*Assistant Examiner* — Christopher Buchanan
(74) *Attorney, Agent, or Firm* — Greenberg Traurig, LLP

(57) ABSTRACT

A system and method for provisioning services accessible via a broadband network. The system receives a user selection of one or more services that have been deemed to be available to the user via the network as well as user registration information. The user registration information may include billing information and a user identifier such as a login id or email address. The system then authenticates the identity of the user with an ISP and communicates the user identifier to each provider of each selected service. The registration information and information representative of any selected service is also communicated to a billing engine. In this manner, a user may access each product or service and be billed appropriately for its usage.

3 Claims, 13 Drawing Sheets

Qualification Process using ISP's Web Systems

SYSTEM AND METHOD FOR PROVIDING ACCESS TO NETWORK SERVICES

RELATED APPLICATION

This application claims the benefit of U.S. Provisional Patent Application Ser. No. 60/335,364 filed on Oct. 31, 2001 and entitled "System and Method For Provisioning Network Services" which is incorporated herein by reference in its entirety.

BACKGROUND OF THE INVENTION

This invention relates generally to networking technologies and, more particularly, relates to a system and method for providing access to network services.

High bandwidth access to the Internet is presently obtainable via digital subscriber line ("DSL") networks offered by local exchange carriers ("LECs") and hybrid fiber coax ("HFC") networks offered by major cable companies. While high bandwidth access is becoming more ubiquitous, customer demand for high bandwidth access still lags behind the demand for access provided by dial-up Internet service providers ("ISPs"). This lack of demand may be caused by the fact that the aforementioned high bandwidth access providers typically do not offer customers the same suite of services (e.g., email, web hosting and, most importantly, technical support to facilitate connectivity to the network) as do dial-up ISPs.

In an attempt to increase the demand for high bandwidth Internet access, DSL providers have partnered with ISPs whereby ISPs provide customers access to their suite of services. Current implementations are both DSL provider and ISP provider specific. However, the operational costs of maintaining the geometric growth in interfaces required to support this partnership threatens their long-term economic viability. Meanwhile, the cable HFC network has remained somewhat more closed to the idea of teaming with ISPs. This is due to lack of infrastructure in the case of smaller franchises and the lack of competitive offerings in the case of AT&T and Time Warner (@Home and AOL respectively). Nonetheless, as the operators of these HFC networks begin the process of opening their networks to ISPs the same issues and problems will arise as are presently found in the presently implemented DSL/ISP partnerships.

An additional concern for ISPs with respect to these partnerships is the negative profit margin they realize. In this regard, the high operational costs combined with the high prices of broadband network access charged by the network providers assure that simply offering email, technical support, etc. will not suffice as a long term business model for ISPs. To survive, ISPs must generate high margin, sustainable revenue in the form of additional services and products offered to high bandwidth customers. Examples of these types of additional services would be music downloads, network disk storage, file backup services, etc. However, creating order entry, provisioning and rating capabilities across a large number of service providers using existing technologies would add another layer of operational complexity and increases the time to market for offering these types of new services. These costs can become so high as to prohibit ISPs from realizing this type of revenue. Small service providers would also have a much higher cost of entry into this market due to the number of disparate interfaces that need to be created to reach all their potential customers.

In an attempt to solve some of these problems, CableLab's B2B effort is proposing to develop standards for the creation of the necessary network interfaces. Furthermore, various venders in the enterprise application integration ("EAI") and network spaces offer partial solutions using their software products to try and achieve a pseudo-standard interface to each provider/partner. These solutions, however, focus only on user qualification, order entry and basic provisioning. Complex product catalogs and usage rating are not being considered. Accordingly, presently contemplated solutions will not remove the operational complexity that results from a system having interconnects and monthly reconciliations with many partners.

Still further, as broadband networks become more complex and grow in size, the issue of IP address space will becomes a critical concern. New IP address space is becoming more and more scarce and, therefore, more valuable. While proposed industry solutions to this problem vary, most suggest creating a clear delineation of IP space between DSL/HFC networks and ISP assets. While this solution may provide a short term solution to the problem, as the Open Access model grows IP address space will again become a scarce commodity.

SUMMARY OF THE INVENTION

To address these and other deficiencies, a system and method for providing access to network services is provided. Generally, an open access broker system receives a user selection of one or more services/products that have been deemed to be available to a customer via the network as well as customer registration information. The customer registration information may include billing information and a customer identifier such as a login id or email address. The open access broker system then authenticates the identity of the customer with an ISP and communicates the customer identifier to each provider of each selected service/product. The registration information and information representative of any selected service/product or service is also communicated to a billing engine. In this manner, a customer may access each product or service and be billed appropriately for its usage.

As will become apparent, the subject invention has, among others, the advantage of offering one interface for all connectivity and data flows. ISPs, broadband service providers ("BSPs"), broadband content providers ("BSPs"), and network providers ("NPs") would operate one interface to the system, dramatically reducing their operational costs. ISPs would be able to qualify potential customers across all available network providers to find the best fit from a bandwidth, cost and install time perspective. BSPs would be able negotiate complex revenue share deals with network providers and ISPs without having to invest in sophisticated in house systems. Still further advantages include:

- Allowing BSPs, NPs, and ISPs to manage one API connection yet conduct business with all members of the consortium.
- Tracking of user identity across systems.
- Extending serviceability across all "users" of the open access broker.
- Bringing IP management and IP space allocation calculus into the provisioning process.
- Provisioning across multiple providers and services. (A customer purchasing plan A from an ISP would generate multiple provisioning events across a number of providers within the broker network.)
- Facilitating transactions and rating of these transactions simultaneously. (Simply passing transaction messages is a core function, but one that many technologies offer. The subject open access broker system will apply rating rules to a transaction and generate the necessary events. Example: Purchase of 100$^{th}$ MP3 may qualify a user for a discount, something that could be tracked with a billing system. But the downloading of this may automatically put the user over their bandwidth quota, potentially changing the cost of the transaction and triggering specific events.)

Ability to support e-Wallet technologies. (As standards emerge for wallet support the broker service will handle the tracking of user purchases and facilitate billing for those purchases.)

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to preferred embodiments shown in the attached figures in which.

DETAILED DESCRIPTION

Figure 1:
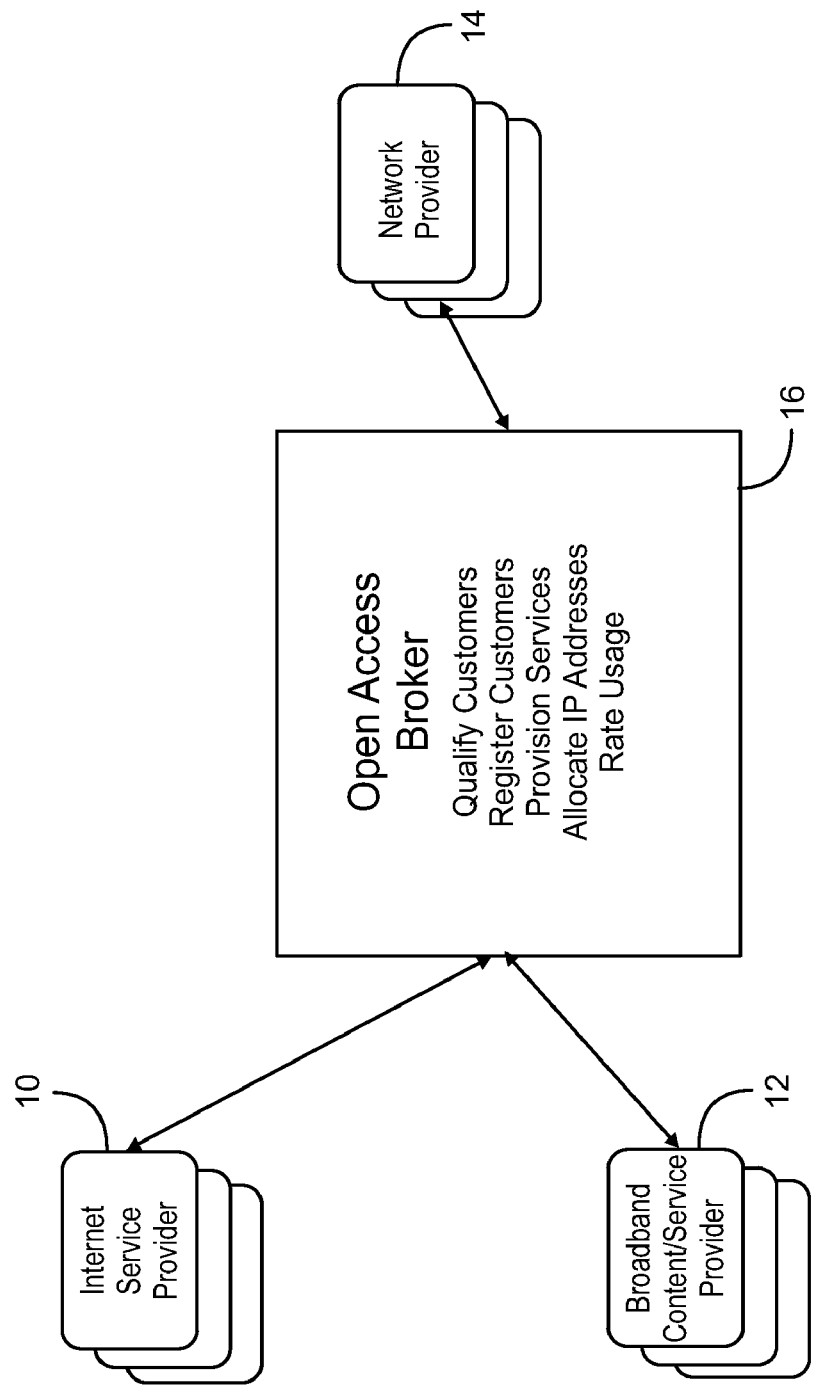
FIG. 1 illustrates an exemplary network environment.

Turning now to the figures, wherein like reference numerals refer to like elements, there is illustrated exemplary systems and methods for providing access to network services. Generally, the described systems and methods reside in broadband network which includes one or more network partners, such as Internet Service Providers ("ISPs") 10, Broadband Content Providers ("BCPs")/Broadband Service Providers ("BSPs") 12, and Network Providers ("NPs") 14, which exchange messages with an Open Access Broker 16. As will be described in greater detail below, the Open Access Broker 16 cooperates with the other network partners to perform various tasks including those tasks associated with qualifying customers, registering customers, provisioning services, allocating IP addresses, and rating usage.

As will be appreciated by those of skill in the art, the network partners and the Open Access Broker 16 generally reside on one or more general purpose computing devices which operate under the control of computer executable instructions. The general purpose computing device need not be limited to computers and servers but may include handheld devices, multiprocessor systems, microprocessor-based or programmable customer electronics, minicomputers, mainframe computers, and the like. Furthermore, the computer executable instructions may include routines, programs, objects, components, and/or data structures that perform particular tasks. Within the network, the computer executable instructions may reside on a single general purpose computing device or the tasks performed by the computer executable instructions may be distributed among a plurality of the general purpose computing devices.

For performing the tasks in accordance with the computer executable instructions, the general purpose computing devices preferably include one or more of a video adapter, a processing unit, a system memory, and a system bus that couples the video adapter and the system memory to the processing unit. The video adapter allows the computing devices to support a display, such as a cathode ray tube ("CRT"), a liquid crystal display ("LCD"), a flat screen monitor, a touch screen monitor or similar means for displaying textual and graphical data to a user. The display allows a user to view, enter, and/or edit information that is relevant to the operation of the system.

The system memory in the general purpose computing devices may include read only memory ("ROM") and/or random access memory ("RAM"). The general purpose computing devices may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices.

To allow communications between the general purpose computing devices, the general purpose computing devices preferably include a network interface or adapter. While the preferred embodiment contemplates that communications will be exchanged primarily via a broadband network, other means of exchanging communications are also contemplated. For example, a wireless access interface that receives and processes information exchanged via a wireless communications medium, such as, cellular communication technology, satellite communication technology, blue tooth technology, WAP technology, or similar means of wireless communication can be utilized by the general purpose computing devices.

To provide network security, the general purpose computing devices may also utilize security techniques that have become customary when conducting electronic business. These security techniques include, but are not limited to, firewalls, encryption, authentication certificates, directory-based user registration and security management, etc. Because the capabilities and best practices of network security are constantly evolving and improving, this document does not espouse the use of any particular technique, technology or product. Rather, it simply specifies that the network architecture should support the use of security practices necessary to protect the business interests of the participants and to insure the overall integrity and confidentiality of information within the system.

For exchanging information between the partners within the network any networking protocol can be utilized. For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. An example of a message queuing system is IBM's MQ-Series or the Microsoft message queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

Figure 2:
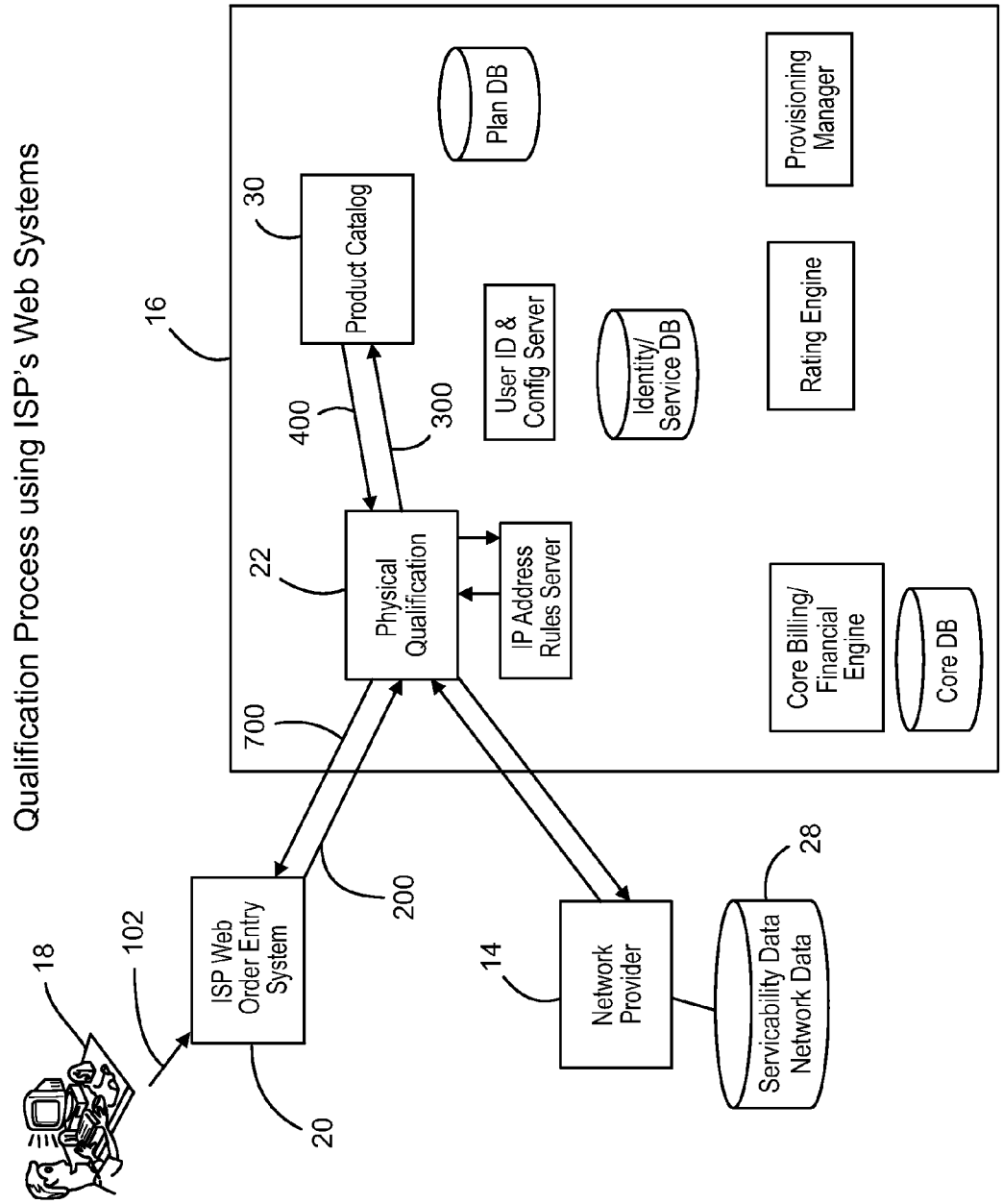
FIG. 2 illustrates an exemplary open access broker system in connection with an exemplary qualification process using an ISP's Web system.
Figure 3:
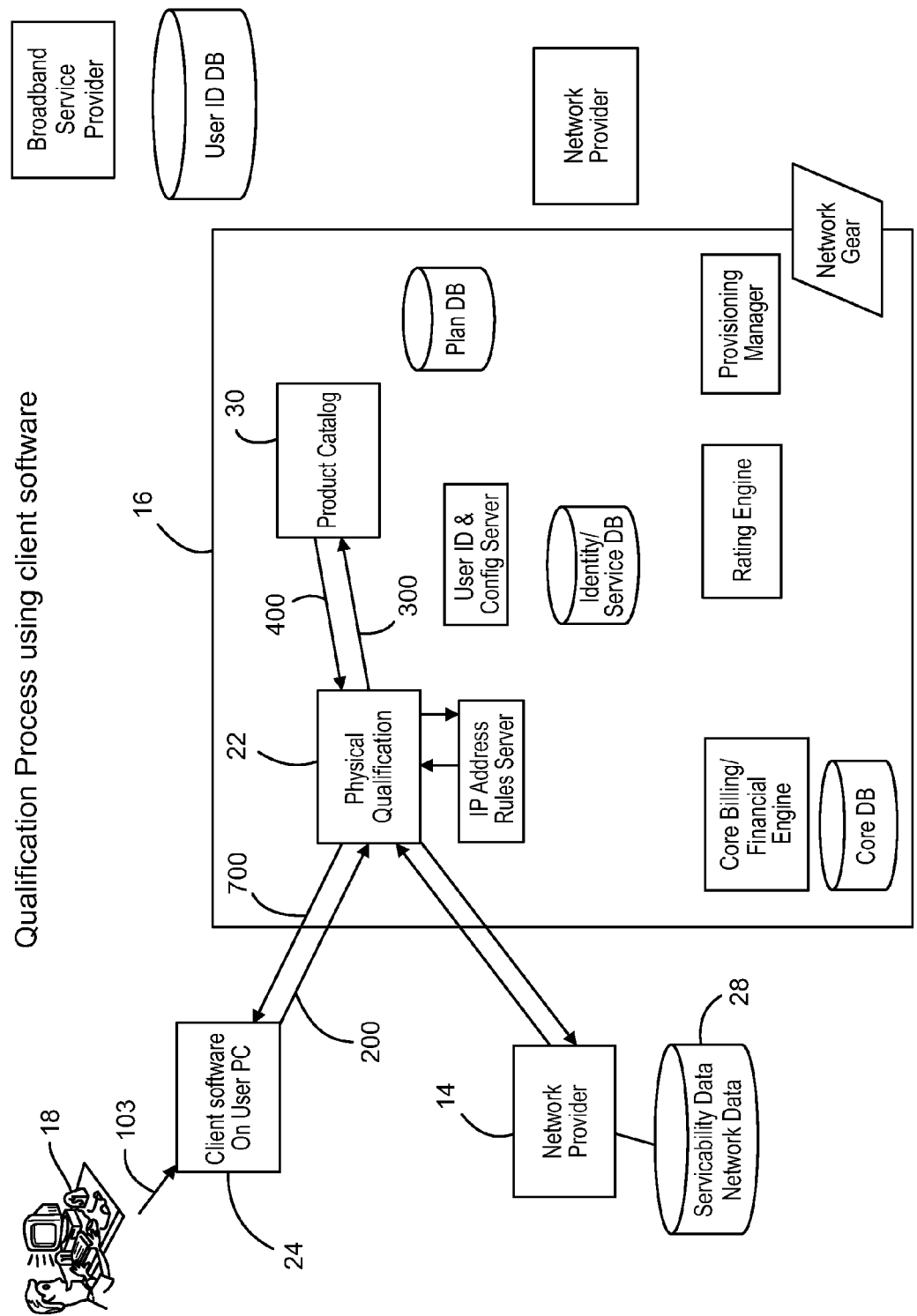
FIG. 3 illustrates an exemplary open access broker system in connection with an exemplary qualification process using client software.
Figure 4:
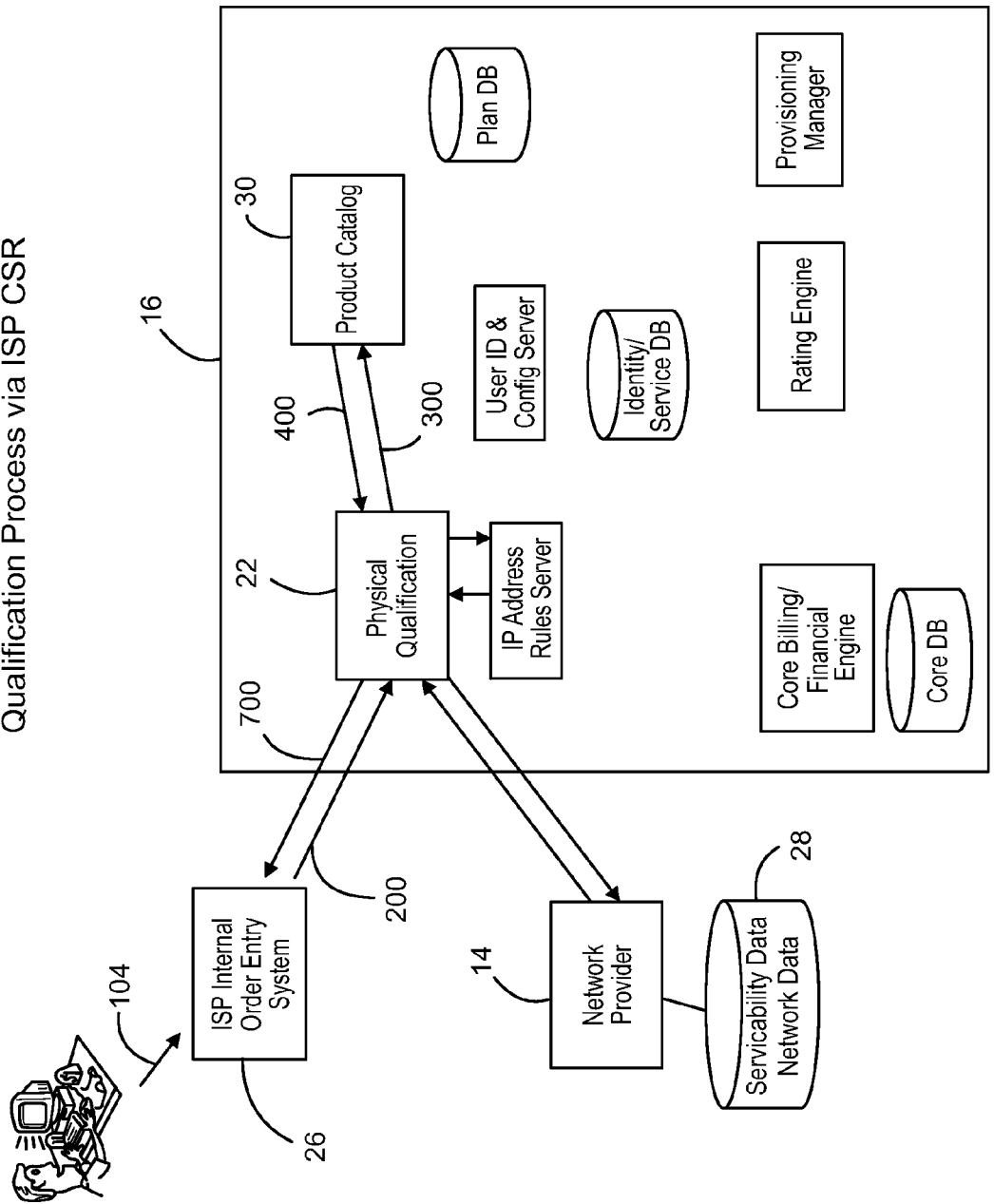
FIG. 4 illustrates an exemplary open access broker system in connection with an exemplary qualification process using a customer service representative ("CSR")

To qualify customers to determine if access to the network and network services/products are available to the customers, the open access broker 16 is adapted to respond to qualification query messages. By way of example, the qualification query message can originate from an ISP's Web system, as illustrated in FIG. 2, from client software executing on a computer of a customer, as illustrated in FIG. 3, from a computer operated by a CSR, as illustrated in FIG. 4, or the like. In the instance where the qualification process is performed using an ISP's Web system, the customer uses a Web browser resident on a computer 18 to access (102) an ISP's Web site 20 and uses information on the ISP's Web site 20 to navigate to a page that allows them to determine if broadband access is available in their area. The ISP's order entry system utilizes an XML API to query (200) a Qualification Module 22 using information entered by the customer such as, by way of example only, name, home address, current phone #, etc.

When the qualification process is initiated using client software, which may be provided by a Network provider or ISP, a customer will install the client software package on a computer 18 and be prompted, via an advertising/marketing message or the like, to upgrade to broadband access. The prompting may bring up an initial qualification screen on the computer 18 and the customer may then provide information which will be used during the qualification process. The client software package may also scan the PC to gather information such as the physical attributes of the machine for use during the qualification process. These attributes could include processor speed, availability of a wired or wireless network interface and other relevant data. The software package then makes a connection (103) to the provider's order entry system 24 using the provider's protocol. The provider's order entry system 24 utilizes the XML API to query (200) the Qualification Module 22 with the information.

When the qualification process is initiated using the services of a CSR, the customer calls the provider call center and speaks to a CSR. The CSR then uses their internal order entry system 26 to take basic information from the customer (104). The CSR system may then utilize the XML API to query (200) the Qualification Module 22 with information supplied by the customer.

In response to a qualification query, received via the XML API, the Qualification Module 22 determines if a physical location or address is capable of receiving broadband access, services and/or products. To this end, the Qualification Module 22 may use a standard address rationalization or "scrubbing" package to format the specified address of the potential customer (which may have been included as information in the qualification query message) to a standard used by the United States Postal Service. Thereafter, the formatted address is processed according the type of access/services/products for which qualification is being sought. The factors used to make the qualification decision are typically different for each type of broadband service.

For data services over an HFC Network, each location capable of connecting to this network may be stored in a database 28, in this case a "Homes Passed" database. The database 28 is populated and maintained by a Network Provider 12 and should be considered to be very accurate. To determine if a location is serviceable, the database 28 is queried by the Qualification Module 22. If the specified location is found within the database 28, service is determined to be available. Often the database 28 will contain information relating the bandwidth available on the sub-network connected to the specified location. This information can also be returned to the Qualification Module 22 for use in subsequent queries directed to the Product Catalog 30.

In the case of DSL services, the location to be serviced must be within a fixed distance from the Central Office ("CO") where DSL and standard telephony switching equipment is located. This distance will vary by the type of DSL being offered and the technologies employed for delivery. The calculation of this distance is normally based on an algorithm supplied by the Network Provider 14. Determining the CO that services a specified location can be performed by querying a Network Provider 14 database 28 using a Network Provider specific query methodology (as this could vary across providers). Once the CO is determined, the distance between the CO and the specified location is calculated using the provider supplied algorithm and, if the specified location is within the maximum allowed distance, the specified location is determined to be qualified.

Given that the exact distance between the CO and the specified location can vary depending on network topology and quality of transmission lines and other gear, a positive qualification answer is not 100% dependable and should be confirmed with a physical visit to the site. The determination of the CO will also influence the types of DSL offered in terms of bandwidth and IP address availability. This information can also be returned to the Qualification Module 22 for use in a subsequent queries directed to the Product Catalog 30.

For satellite or fixed wireless services, qualification can depend on the distance from a central transmission node to a specified location, intervening geography and orientation of any structure used to mount an antenna. For most satellite-based services the antenna must have a clear site line in a roughly southern direction that corresponds to the location of a satellite in geosynchronus orbit. If this exists, then the location would qualify for services in most cases. Since the potential customer could be prompted to answer basic questions to determine if the factors listed above actually exist, the Qualification Module 22 may not be necessary in this case.

For fixed wireless service, qualification requires the antenna to be within a certain distance from the transmission node without large intervening buildings or hills/mountains in the line of site. For use in this qualification determination, the fixed wireless network provider would supply the Qualification Module 22 data, either at the zipcode+4 level, or a larger "Homes Passed" database, to be used to determine if the specified location meets the distance requirement. With respect to the reliability of this determination, the final qualification would normally be made during the installation process. Information pertaining to the transmission and network gear may also be returned to the Qualification Module 22 for use in a subsequent queries directed to the Product Catalog 30 as it may impact upon the products/services that can be offered.

It should be appreciated these the above described factors are but examples of the considerations that may be taken into account during the qualification process and are not intended to be limiting. Other factors may also be considered. For example, while the customer may qualify for access to a Network Provider's network based upon the specified location, it is possible that the provider may not have the necessary capacity from a switch, router, head end, or IP address stand point to offer the service. Given the scarcity of resources, it is also possible that that a provider may prioritize access to the network whereby the resources are limited to certain high end plans for large customers, businesses, etc. which the potential customer must be to qualify. These factors, and still others, may be considered by the Qualification Module 22 during the qualifying process.

If it is determined that the potential customer is not qualified for services, the negative determination is relayed to the requesting entity/customer. Typically, this would information would be relayed to the customer via the ISP Web site 20, provider OES 24, or CSR 26 (as appropriate) which would be would have been informed of the negative determination in a message transmitted (700) by the Qualification Module 22. In cases where a determination is made that an access offering is not available due to resource constraints, this fact can be flagged when the appropriate entity is informed of the results of the qualification query. Accordingly, the access offering may still be listed in the reply message that is returned to the inquiring entity but would flagged as being unavailable due to resource constraints. The requesting entity can process this information differently, depending on their own internal policies. For example, an ISP may maintain their own waiting list of customers interested in DSL service and could periodically check the availability of DSL access on behalf of potential customers should the constraints which caused access to be denied be removed.

If, however, it is determined that the potential customer is qualified for one or more types of access to the Network, a query (300) is made to the Product Catalog Server 30 to retrieve (400) a list of offerings available, if any, at the specified location for the class of customer. The offerings include types of access, products, services, or combinations thereof, without limitation (collectively referred to as "services"). If any offerings are available, a list of such offerings may be returned (700) with a positive reply to the qualification inquiry. The potential customer may then view the available offerings for possible purchase as will be described hereinafter.

To populate, access and/or configure listings of offerings within the Product Catalog 30, providers can use the XML API's made available by the Open Access Broker 16, a GUI based tool, or the like. By way of example, assume that a Network Provider 14 offers HFC network connectivity across their network and that a customer can purchase this access with a variety of bandwidth and total usage constraints. The Network Provider 14 may organize these offerings within the Product Catalog 30 as one service with attributes or as a selection of different services each with a set of fixed attributes. The Network Provider 12 may also offer email or web hosting services. These services can similarly be listed as components in the Product Catalog 30 that can be assembled into a larger offering or "Plan."

Plans can be constructed using the services of one provider or across providers. For example, an ISP 10 may offer the "High Speed Cable Gold" Plan which consists of cable HFC network access for up to 3 PCs with a 30 Gigabit bandwidth quota per month, 3 email addresses, 20 free music downloads per month, and 30 MB of online backup. The network access is provided by Network Provider A, the email by the ISP, the music downloads by BSP B, and the online backup by BSP D. Furthermore, plans can delineate rating guidelines as appropriate for each service offered within the plan. Using the same example list, the bandwidth quota is 30 GBs of network usage per month. Once this level is exceeded a variety of actions could be taken. The user could be charged for each MB or GB of excess usage and the Network Provider may bill another provider for this usage (the ISP in this example), the user's access could be terminated, etc. Accordingly, it will be appreciated that the rating guidelines used can be varied by product type and as deemed appropriate by the network partners. Further components of a plan can be a pricing model and financial settlement rules for that plan. Typically, each plan has a unit or recurring charge to the end customer. How the revenue from the customer's purchase is divided among the various providers and how usage is allocated across these providers would therefore be determined by settlement rules outlined in the Plan definition.

For each given network access service that is physically available to the customer at their specified location there may be many possible offerings or plans listed in the Product Catalog 30. The final determination as to which of these offerings or plans are ultimately made available for selection by the end customer can be based on a number of factors. These factors can be listed as part of an offering definition in the Product Catalog 30. For example, some offerings/plans may have their availability limited to only those customers that have entered a promotional code during the qualification process. Other offerings/plans may be segmented by geographic region or by the number of computers a customer wishes to connect to the network. Preferably, the owner of the offering/plan creates the final business rules that surround it as well as the settlement rules involved. It should be noted that multi-vendor plans would be based on previously negotiated contractual agreements between the providers. How these arrangements are determined is outside the scope of this document.

Figure 5:
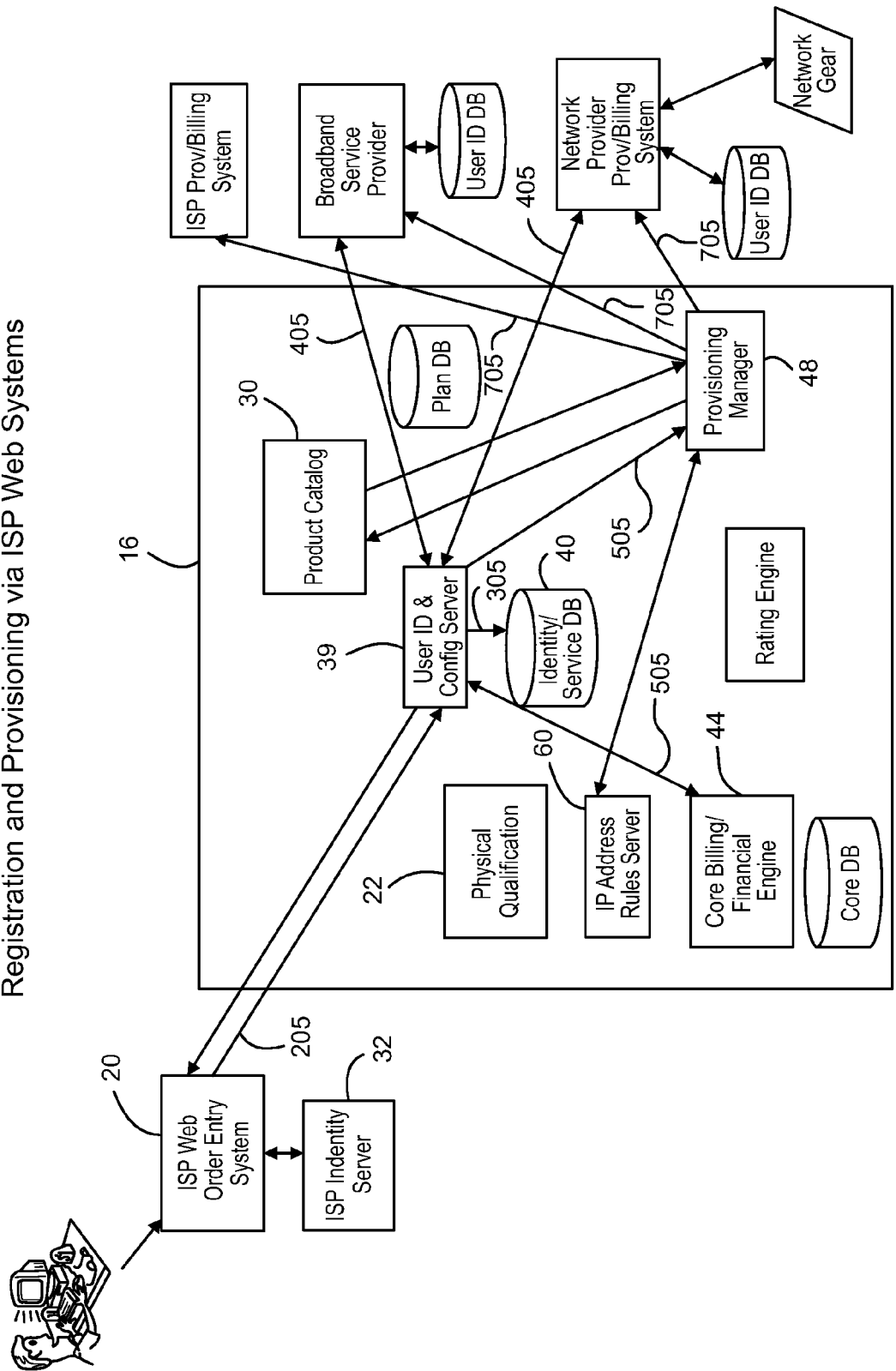
FIG. 5 illustrates an exemplary open access broker system in connection with an exemplary registration and provisioning process using an ISP's Web system.

Once a customer has been provided with the offering options that are available, the customer may request to become a registered user of one or more of the services. In the case where registration is performed via the ISP Web site, illustrated in FIG. 5, the customer again navigates the ISP's Web site to select the offering(s) of interest. In this process, the customer may be asked to provide any necessary billing and contact information. Typically, this step would involve queries of the Product Catalog 30 as the necessary billing and contact information is preferably maintained within the Product Catalog 30 in the form of credit and business rules of the provider(s) offering the service(s).

In connection with the registration process, a customer may also be offered the opportunity to chose a login id/email username. If the customer proposes a login id/email username, the proposed login id/email username will be checked against entries in the ISP's authentication/name database 32 until an unused login id/email name is proposed. The exact composition of the database 32 would be under the control of the ISP, but at a minimum it will contain a username/password pair for network login and any other services such as email offered by the ISP. Once a unique login id/email username choice is selected for/by the customer, the information collected would be forwarded (205) to the ISP's internal systems and then to the Open Access Broker 16 using XML APIs provided.

Figure 6:
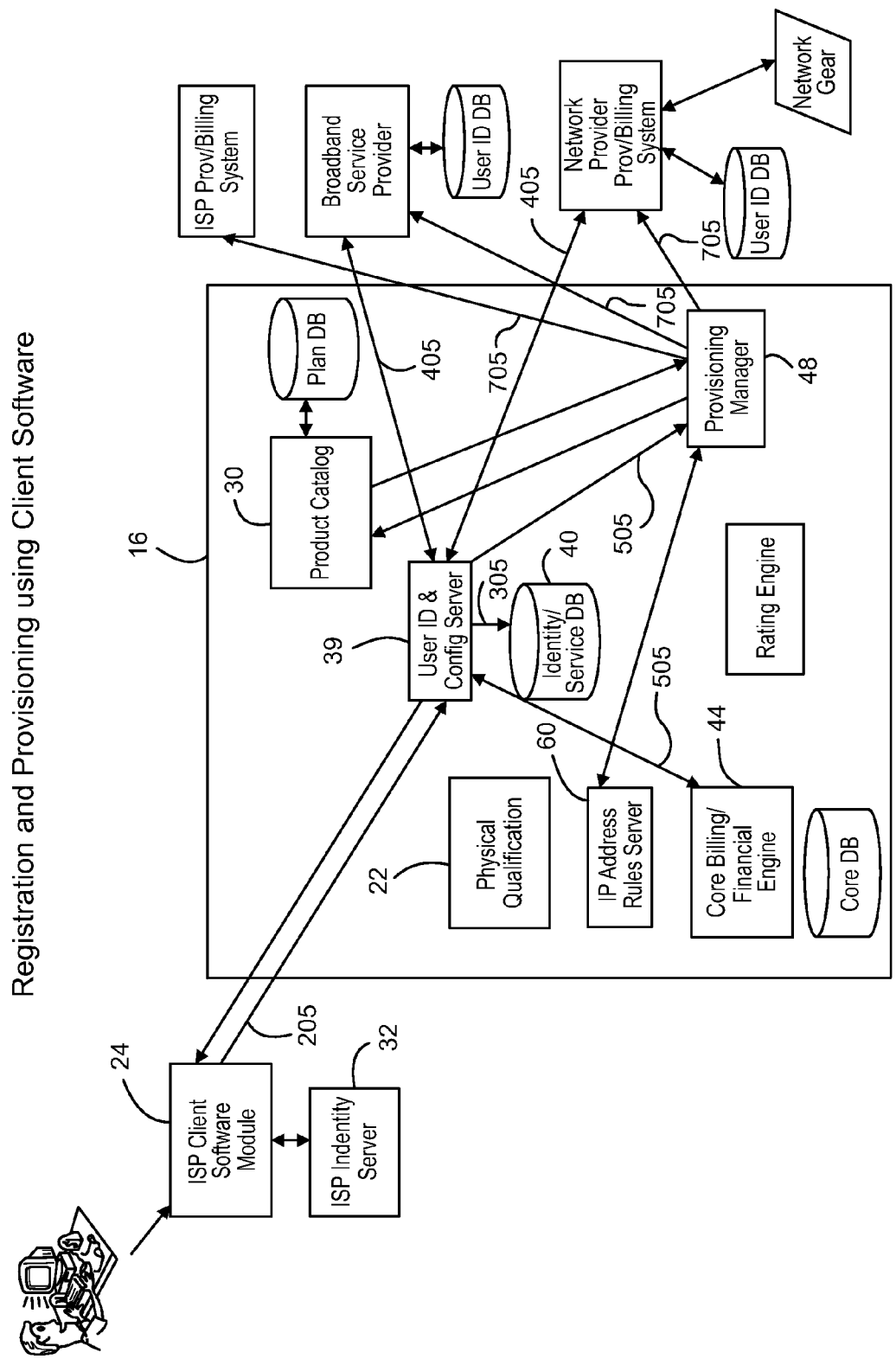
FIG. 6 illustrates an exemplary open access broker system in connection with an exemplary registration and provisioning process using client software.

When the initial access by the customer to the network is by means of client software, as illustrated in FIG. 6, the client software will parse the reply message returned by the Qualification Module 22 and will display the options available to the customer. The client software will then prompt the customer to make selections. The client software would also prompt the customer for any necessary billing and contact information required by the Provider of any selected offerings which requirements would be retrieved from the Product Catalog 30. Again, the customer may be given the additional opportunity to choose a login id/email username. To verify the availability of any selected login id/email username, the client software can use the ISP's internal methodologies to compare the choices of the customer against the ISP's authentication/name database 32. Once a unique login id/email username choice is selected for/by the customer, the information collected would be forwarded (205) to the ISP's internal systems and then to the Open Access Broker 16 using XML APIs provided.

Figure 7:
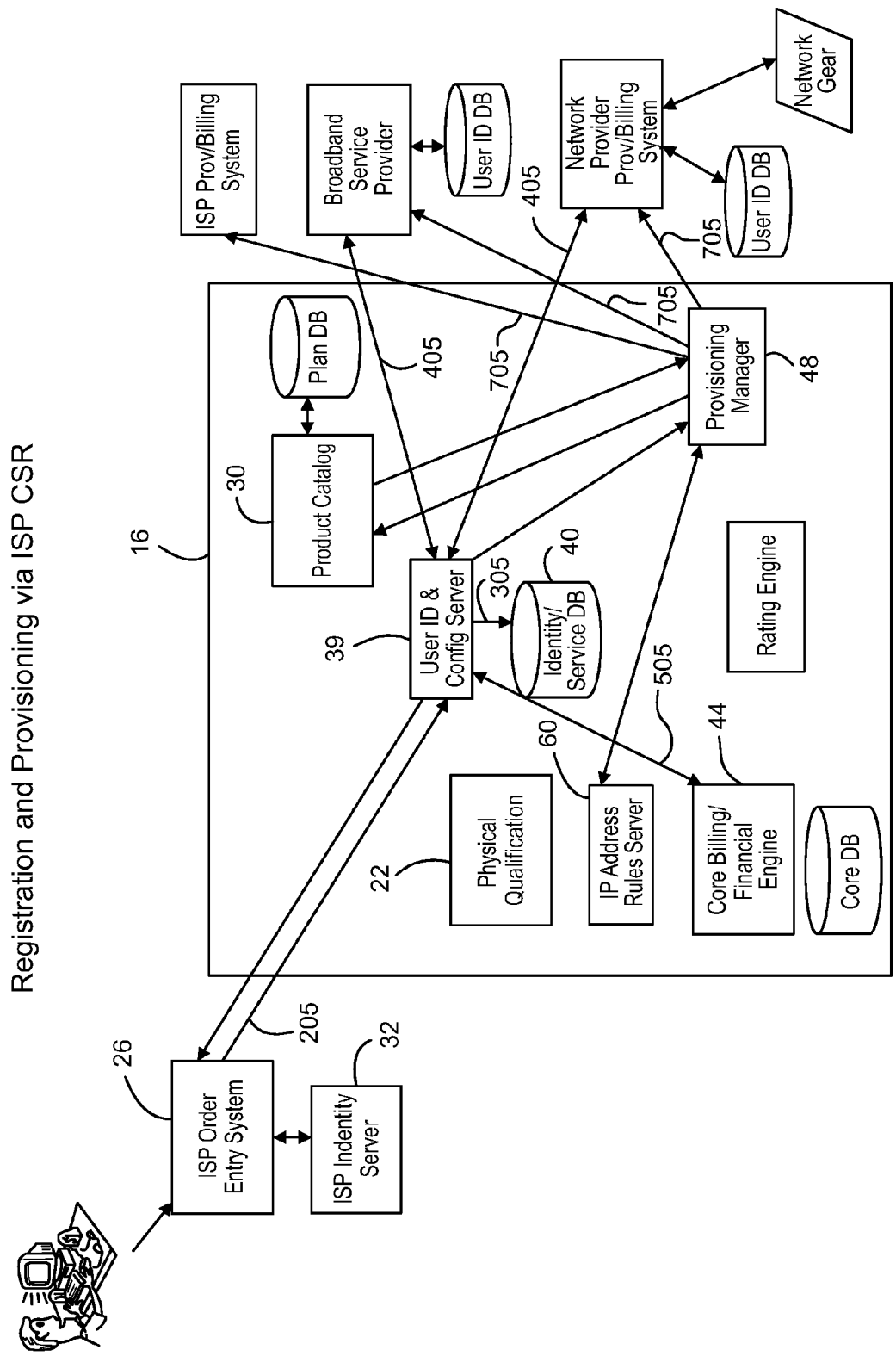
FIG. 7 illustrates an exemplary open access broker system in connection with an exemplary registration and provisioning process using an ISP's CSR.

When the initial access by the customer to the network is by means of an ISP CSR, as illustrated in FIG. 7, the CSR will relay the options available to the customer as indicated by the Qualification Module 22 and will prompt the customer to make any desired selections. The CSR would also gather any necessary billing and contact information required by the Provider of any selected offerings which requirements would be retrieved from the Product Catalog 30. Again, the customer may be given the additional opportunity to choose a login id/email username. The CSR would use their order entry system 26 to verify the availability of any selected login id/email username against the ISP's authentication/name database 32. Once a unique login id/email username choice is selected for/by the customer, the information collected would be forwarded (205) to the ISP's internal systems and then to the Open Access Broker 16 using XML APIs provided.

Figure 8:
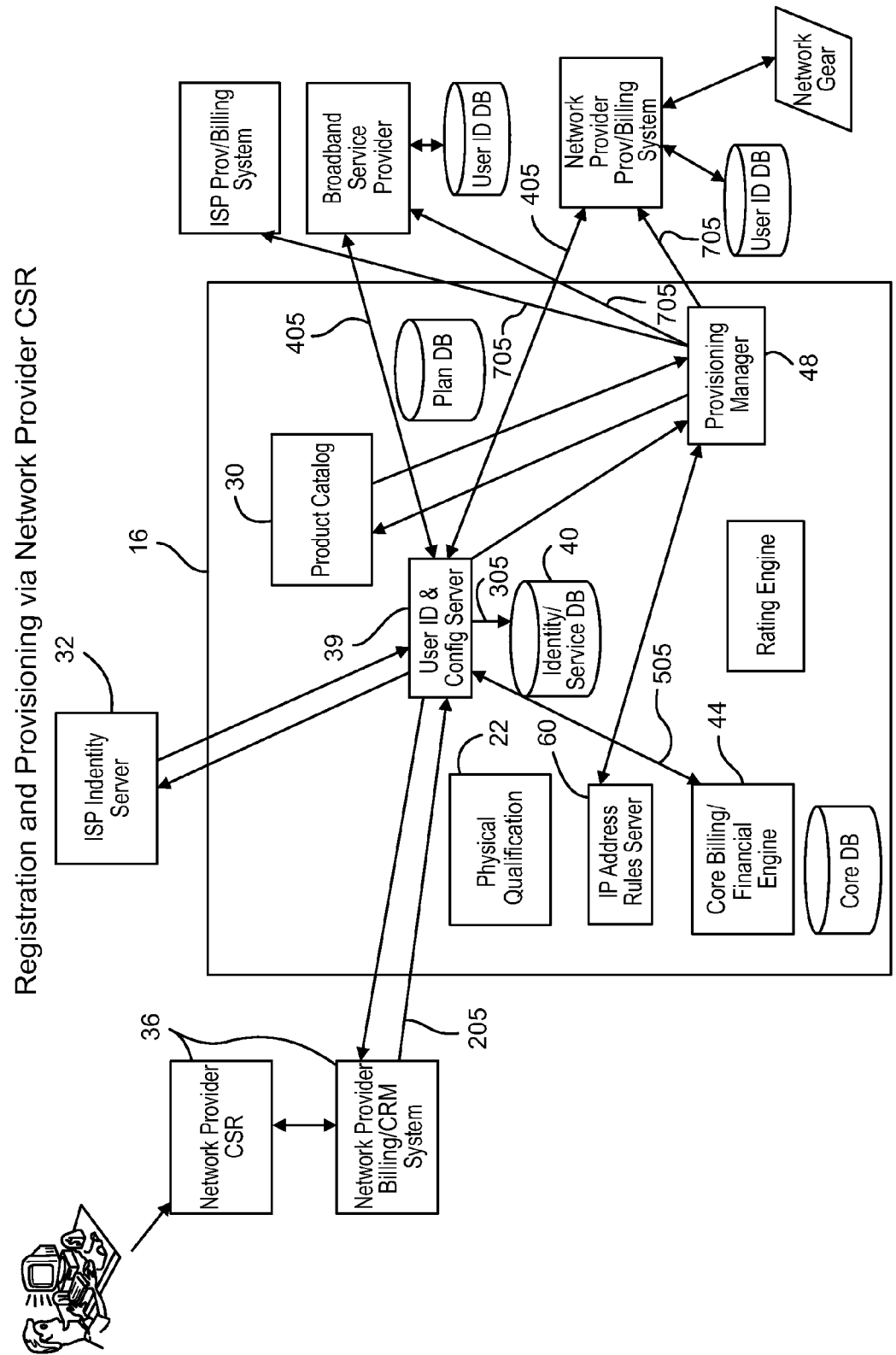
FIG. 8 illustrates an exemplary open access broker system in connection with an exemplary registration and provisioning process using an NP's CSR.

When the initial access by the customer to the network is by means of a Network Provide CSR, as illustrated in FIG. 8, the CSR will relay the options available to the customer as indicated by the Qualification Module 22 and will prompt the customer to make any desired selections. The CSR would also gather any necessary billing and contact information required by the Provider of any selected offerings which requirements would be retrieved from the Product Catalog 30. Again, the customer may be given the additional opportunity to choose a login id/email username. The CSR would use their order entry system 36 to communicate with the ISP's authentication system/database 32 via the Open Access Broker 16 to verify the availability of any selected login id/email username. Optionally, the Network Provider can create and assign a unique id to the customer that is valid or required for the network systems. In this case, the customer would still chose an email username that will be used as the unique ID across the Open Access system. Once a unique login id/email username choice is selected for/by the customer, the information collected would be forwarded (205) to the Open Access Broker 16 using XML APIs provided.

Upon receiving the registration information, i.e., login id/email username, billing and contact information, etc., a User Id and Configuration Server 39 within the Open Access Broker 16 is used to track configuration data for each service purchased by the customer. This data will vary depending on the service type, but can include such things as IP subnet allocations, network connection points, and email servers for mail accounts. One particular piece of data that is preferably tracked is the MAC address of the customers network gear, whether that is a DSL modem, cable modem, or the wireless termination point. MAC addresses are unique Ethernet network addresses assigned to every node on a network, including routers, DSL/Cable modems and PCs. Since most networks assign IP addresses on a temporary basis it is not always possible to determine the identity of a customer by IP address. However, MAC addresses can be tracked by network monitoring software to track each packet of information sent by a customer for the purpose of calculating usage and tracking network abuse.

Additionally, the User Id and Configuration Server 39 can directly enter (305) the username choice in an Identity/Service database 40 since it is already checked against the ISP's master authentication database. The Identity/Service database 40 is used to store customer authentication information across all providers for the purpose of tracking usage events and rating these events. Since it is possible for a user to have a different username or login at each Provider, the Identity/Service database 40 allows for the tracking of these relationships so that usage of the services of a Provider can be rated and the appropriate financial settlements calculated. The Identity/Service database 40 should communicate with each Provider's authentication/identity systems to assure that all data is synchronized across providers since each provider has other sources for this data. One positive consequence of the Identity/Service database 40 is that customers who do not yet have an identity with a service provider, or are willing to change identities, can request that the system automatically provision the username across all the selected providers [see the registration process above] giving them one username to use across providers.

Within the Identity/Server database 40, two major types of data are stored for each customer. The first type of data maintained for the customer is a collection of data elements that represent the user's login id/username data for each offering of each Provider purchased by the customer. This information can be referenced by an integer key that is unique across the entire customer base and which preferably remains constant during the entire existence of the customer within the database 40. It will be appreciated that this key is not used by the customer to access services of a Provider.

The second type of data maintained for the customer is a customer facing key. The customer facing key is a unique username@domain combination that is also the primary email address for the customer [the key is unique due to the design of the original Internet domain and email naming standards]. By storing 2 unique keys for each customer it is possible for the system to reconcile changes in the customer's email address by simply changing this entry alone, leaving the integer ID and all other entries unchanged. Also, when customers authenticate against a provider's self-care systems they are asked for authentication information in the form of a unique username@domain string. The provider's systems can thus use the customer facing key when communicating with the Open Access Broker 16.

Since the customer facing key will become the unique identifier for the customer across all vendors and services, the customer facing key is preferably registered with the Providers if possible. To this end, the User ID and Configuration Server 39 will refer to the Product Catalog 30 to determine the vendors and specific services that need a user identifier. (If a user identifier is not need, usage could tracked using MAC address<->Unique ID relationships). Then, using XML APIs or interfaces provided by the Network Provider 12, the Open Access Broker 16 communicates (405) with the Network Provider's systems to create the necessary authentication entries. Using the XML API's, the identity information will also be forwarded (405) to the Service Providers listed in the plan.

If an identity currently exists on the service providers system an error condition should not be created. Rather, the service provider should be notified that this user is now being rated as part of an overall Open Access plan. If the identity does not exist, it will be created.

The registration information is also forwarded (505) by the User Id and Configuration Server 39 to a Core Billing and Financial Engine 44 and a Provisioning Manager 48. The Core Billing and Financial Engine 44 uses the information to create a record for a customer within a related database 45. If the customer currently has a service provided by the network provider, their record will be updated to reflect the new services purchased. As will be described hereinafter, the Core Billing and Financial Engine 44 is utilized in connection with the rating and usage billing process.

Figure 11:
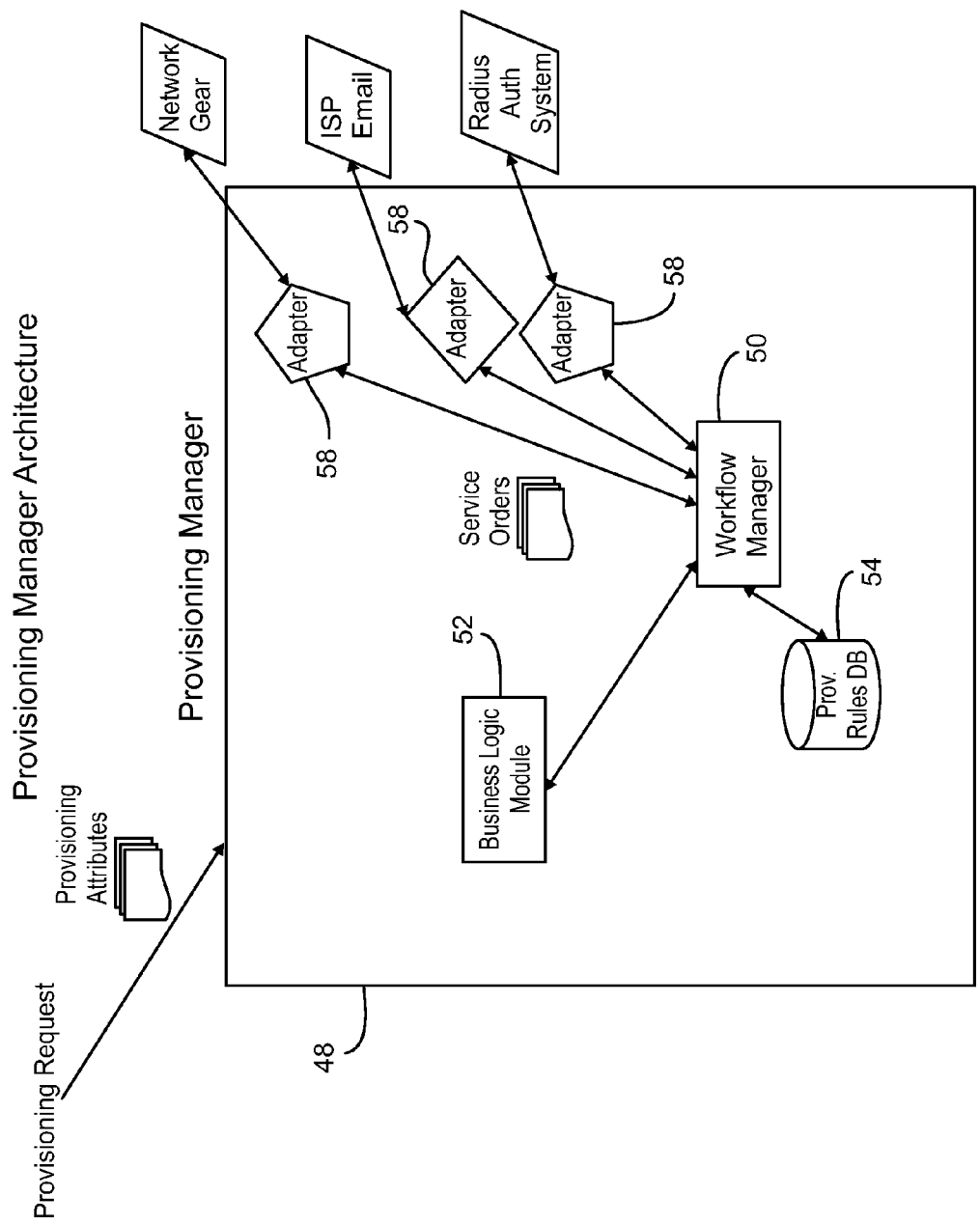
FIG. 11 illustrates an exemplary provisioning manager architecture.

The Provisioning Manager 48 is responsible for the physical provisioning of services purchased via the Open Access Broker 16. The Provisioning Manager 48 may also be used to track the status of each of the steps within the provisioning process. For each type of purchasable service different steps may be taken in the provisioning process and different messaging interfaces may be used to add, change, and delete customer information within the systems (705). In order to meet this diverse set of requirements, the Provisioning Manager 48 is designed with a central core module surrounded by any number of adapter modules coded to work with specific device interfaces. An exemplary architecture is illustrated in FIG. 11.

The central core module comprises a Workflow Manager 50, a Business Logic Layer 52, and a Provisioning Rules Database 54. Workflow procedures may be created by the providers using GUI tools and/or the XML APIs with the result being the detailed steps and procedures needed to provision their specific services. To this end, providers can specify interface technologies, data elements that must be gathered and passed on to their systems, and the exact order of steps to be taken to complete any single provisioning task. By way of example only, a typical provisioning workflow could function as follows:

The Workflow Manager 50 receives a request to provision a service for a customer. Within the provision request will be a list of discrete providers and purchased services associated with these providers. Where appropriate, configuration parameters can also be included for relevant service such as an email mailbox size quota, bandwidth rate for network access, etc. Iterating over this list, the Workflow Manager 50 creates a service order 56 for each item that is being provisioned. The workflow procedures used to create a service order reside in the Business Logic Layer 52.

The Workflow Manager 50 also queries the Provisioning Rules Database 54 to retrieve a list of specific systems that must be configured, the appropriate adapters 58 to call to accomplish this task, and the exact data needed by each adapter 58. After a service order 56 is created it is forwarded to the appropriate adapter 58, which is then responsible for interfacing with the specific device or system at the designated provider. The adapter 58 then transmits the service order information to the designated provider which uses the information contained within the service order to accordingly provision the service(s) for the customer.

If the adapter 58 receives an error message indicating that the system of the designated provider was not able to process the service order information, the error message is returned to the Workflow Manager 50 for processing. The Workflow Manager 50 preferably uses procedures defined by the provider of the relevant service to handle error processing. If provisioning errors are fatal (causing the service to not be provisioned), this information is preferably passed back through the Open Access Broker 16 to the entity that initially requested provisioning and, ultimately, to the customer.

It will be understood that change orders and cancellations can be handled in the same fashion, with the Workflow Manager 50 breaking down the steps according to predefined procedures and working with the appropriate adapters 58 to facilitate the process. For example, in the case that a customer wishes to change a username, either for email or for login, the Workflow Manager 50 interacts with the User Id and Configuration Server 39 to track and verify the changes required across all systems.

The Provisioning Manager 48 may further cooperate with the Product catalog 30 and an IP Address Rules Server 60 to determine the proper IP subnet(s) for the service(s), plan selected. If multiple subnets are determined to be available, the Network Provider's 14 allocation mechanism is responsible for handling the selection of the appropriate subnet during the DHCP lease request process. In connection with the allocation, the Provisioning Manager 48 should be directed to refer to the Product Catalog 30 for the list of discrete services that need to be configured to complete the customer's registration process. The Provisioning Manager 48 can then institute the necessary provisioning actions at a provider/device level and complete the necessary steps to provision the user within the ISP's and Network provider's networks in the manner discussed previously. For example, if providers require custom software installs, this is noted and returned to the ISP website as a complete list to be executed by the ISP's systems. The completed list of providers and all identity/download information is returned as an XML message to the ISP systems to be processed by the ISP. The ISP handles the presentation of this information.

The IP Address Rules Server 60 is responsible for the assignment of a discrete IP Address, or address range, at a network access point level for each access device managed by the Open Access Broker 16 provisioning system. Each customer system connects to the larger network through a network device, which could be, but is not limited to, a cable modem, DSL router, or a wireless router. These devices can be provisioned with a permanent static IP address or an IP address assigned for a temporary leased basis using DHCP or other IP address assignment technologies. The IP address may be assigned from a pool of addresses managed and owned by a Network Provider 14, or a pool managed and owned by an ISP 10 depending on the legal agreements in place between providers and ISPs.

As more and more devices are connected to the world wide IP network, the finite address space will be consumed. Efforts are underway to expand the pool of available addresses using technologies such as "Ipv6," but these are not fully developed and supported by mainstream network equipment vendors. Adding to the problem is the enormous capital expenditure that will be required to bring all the network equipment and customer level equipment to this new standard. Accordingly, it is reasonable to assume that IP address space will continue to be a more scarce resource and, as such, will begin to be treated as an independent economic resource much the same way as bandwidth and access are now.

Current methodologies for handling address allocation are based on a temporary leased address model where for each X number of available addresses in Pool Y there are m*X number of end customer devices eligible to receive an address from the Pool Y. Over time, network operators have developed their own algorithms for calculating the appropriate multiplier "m" that results in each customer being allocated an address while minimizing the number of pools that a provider must maintain. As a pool of addresses is over allocated a provider must then apply for additional pools of addresses from the appropriate Regional Internet Registries depending on their geographical location. In the United States, for example, the appropriate Registry is "ARIN." The registries are non-profit organizations funded by industry participants tasked with maintaining a balanced usage of IP address space. In order to receive a new pool of addresses a provider must show a defined need for the pool and have shown proper diligence in terms of managing it's current resources. As the available pools become scarcer it will become more difficult to receive a new allocation and, as such, it will become cost effective to buy under allocated pools from other providers.

As network providers begin to offer access to ISPs the problem becomes moderately more complex. Current arrangements have distinct delineations in place. In some systems the IP address pool used at the customer end is allocated from the ISP's pool while it is allocated at other times from the Network Provider pool depending on the contractual agreement. These rules apply across the entire network and all access points. This type of blanket arrangement will not work in the long run as some network subnets become more crowded than others and some pools are exhausted before others. Therefore, the allocation of IP addresses to customer network devices will become more complex from a business rules standpoint. Also, any system managing the allocation of addresses must now take into account the financial aspects of each allocation transaction, and begin to track the assignment and usage of addresses across providers from a financial reconciliation standpoint.

To overcome these deficiencies, during the initial customer registration and provisioning process, the IP Address Rule Server 60 is responsible for determining if current IP resources exist at a given physical location and network connection point. This determination is performed in conjunction with an IP Address database which contains this detailed network topology and IP address subnet allocation data. The data may be supplied by Network Providers 14 during the initial configuration of the system and should be modified as network topologies are changed and assets added to the system. This data entry can be accomplished either via the published XML API or via the GUI tools provided as part of the Open Access Broker 16 tool set.

Figure 12:
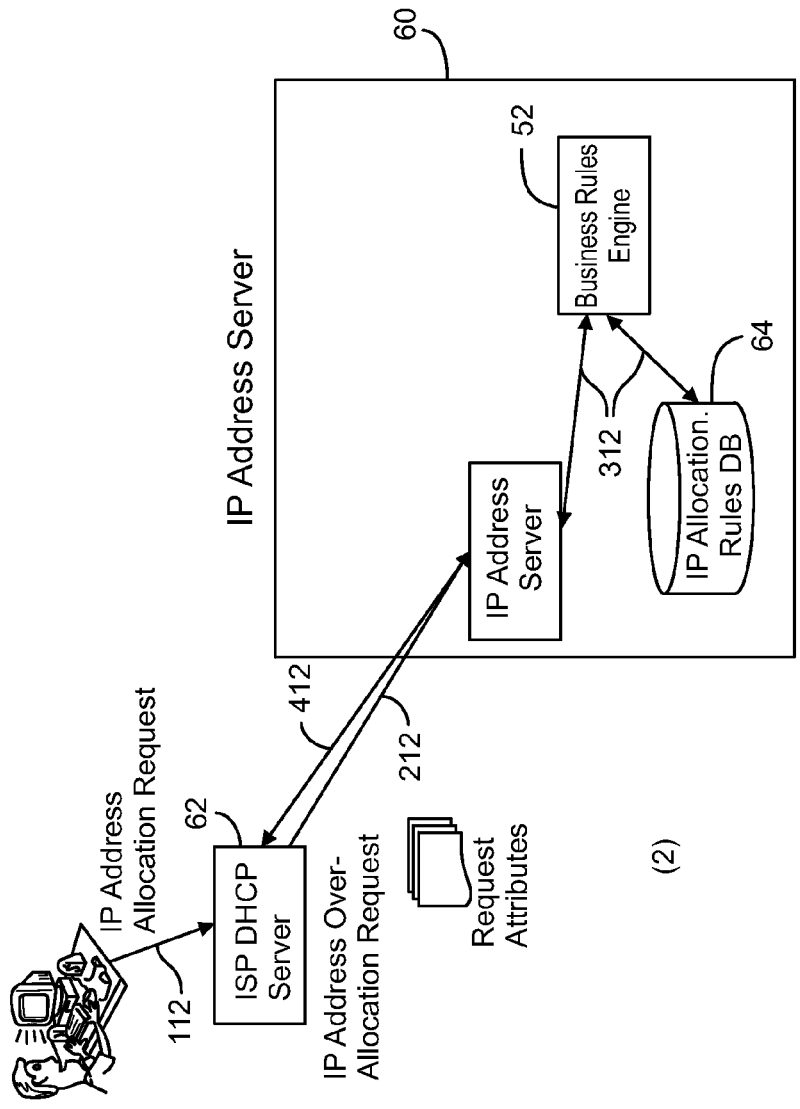

By way of example only, FIG. 12 illustrates a process for flexibly allocating IP addresses to other providers and ISPs for a short time frame [much the same way that energy is managed on the electric grid] within the constraints of the network topology. In the illustrated example, it is assumed that an ISP 10 is responsible for allocating the IP addresses for their customers who have purchases a product "A" in which a Network Provider 14 provides the network access component of Product "A." Due to a major national news event a larger than normal number of users are attempting to access the network (112) and view online news reports. During this temporary spike in usage ISP 10 has run out of available IP addresses. Once the DHCP server 62 that is responsible for allocating those addresses detects the condition, it uses an XML API to make a request to the Open Access Broker 16 for more IP addresses blocks (212). The request message contains a parameter outlining the number of addresses needed, as well as a flag indicating whether the ISP will accept a $3^{rd}$ parties IP allocation, and the maximum it will pay for this allocation.

The IP Address Rules Server 60 takes this request message and processes it by retrieving (312) the business rules outlined previously by the Network Provider 14 to the Business Logic Module 52 as well as the IP Allocation Database 64. If a policy exists that allows the ISP 10 to lease addresses temporarily and there are available IP addresses to lease, a positive response is sent (412) back to the ISP's DHCP system 62 with a parameter outlining the subnet that has been allocated, and another parameter outlining the amount of time that these IP addresses can be leased for. At the same time the IP Address Rules Server 60 sends an IP Over-Allocation Rating Event to a rating engine delineating the details of the transaction and the providers involved. This event is processed as any other rating event and the financial charges allocated appropriately during the billing cycle.

If addresses are not available for allocation from a given Network Provider 14, and the ISP has set a $3^{rd}$ party flag to "Yes," the IP Address Rules Server 60 will then check against the IP Address Database 64 to determine if it is possible to allocate another subnet from a different Network Provider 14 and what the cost of this allocation would be. An additional factor can be involved in making this decision as it may not be possible to route traffic from ISP using a different Network Provider 14. The IP Address Rules Server 60 will attempt to find a subnet to allocate given the network topology and financial constraints set by the ISP 10 in the initial request. If it is possible, a response will be sent to the ISP's DHCP system 62. If the ISP has set the $3^{rd}$ party flag to "NO," a message should be sent from the IP Address Rules Server 60 to a predestinated email address or wireless paging service to alert the ISP's personnel to the pending problem and direct them to a manual system.

To allow ISPs and Network Providers to interface their systems to the IP Address Rules Server 60 an API may be provided. In this manner, operators at each site may inquire into the current state of the system, identify potential problems, etc., using this interface and manually request additional addresses before resource constraints trigger automatic events. Using this interface it will be possible for participants to make bids for address allocation and to accept bids. This allows for overrides to the automatic policy limits set in advance to allow for ISPs and network providers to make appropriate business decisions given a larger set of parameters.

Figure 9A:
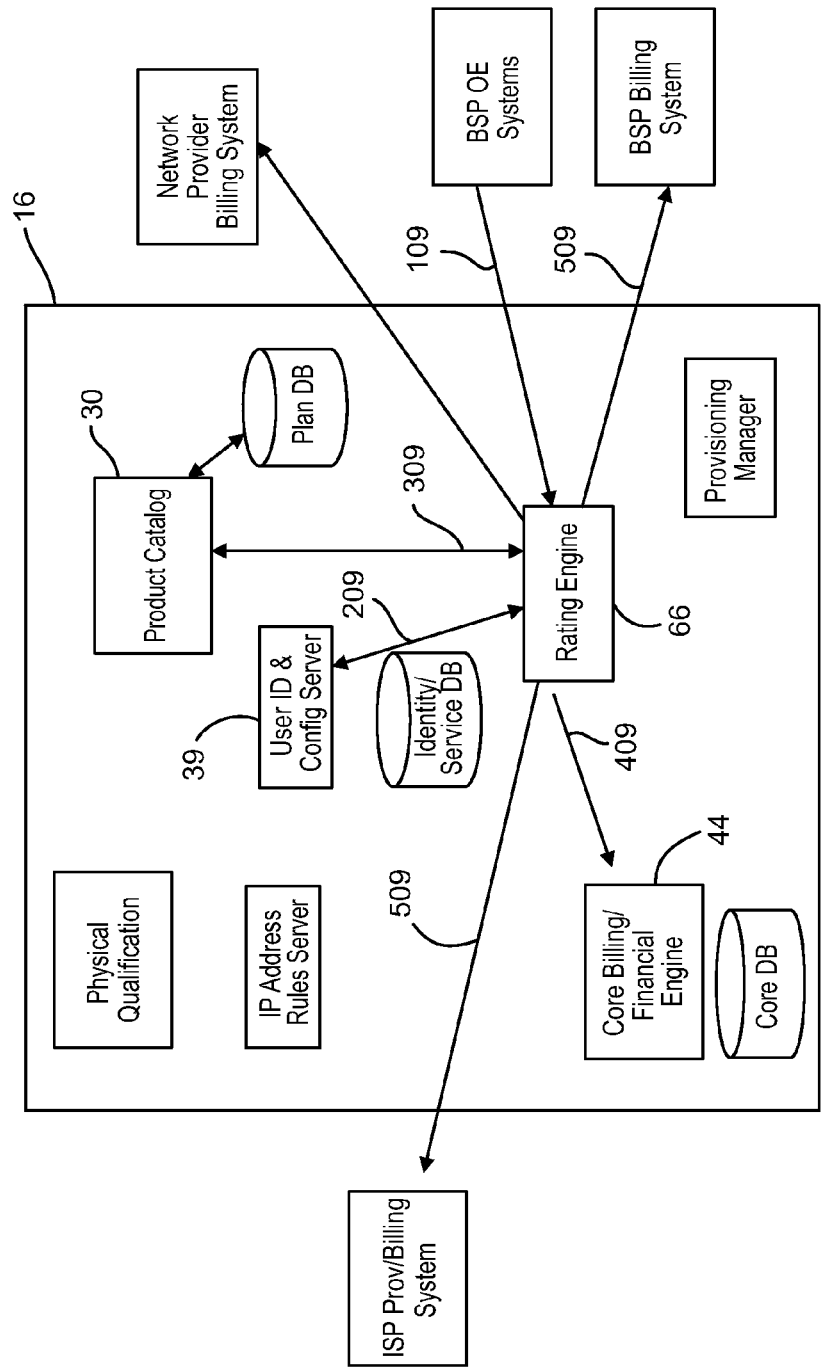
FIGS. 9a and 9b illustrate an exemplary open access broker system in connection with an exemplary process for performing usage and rating of BSP purchases.
Figure 9B:
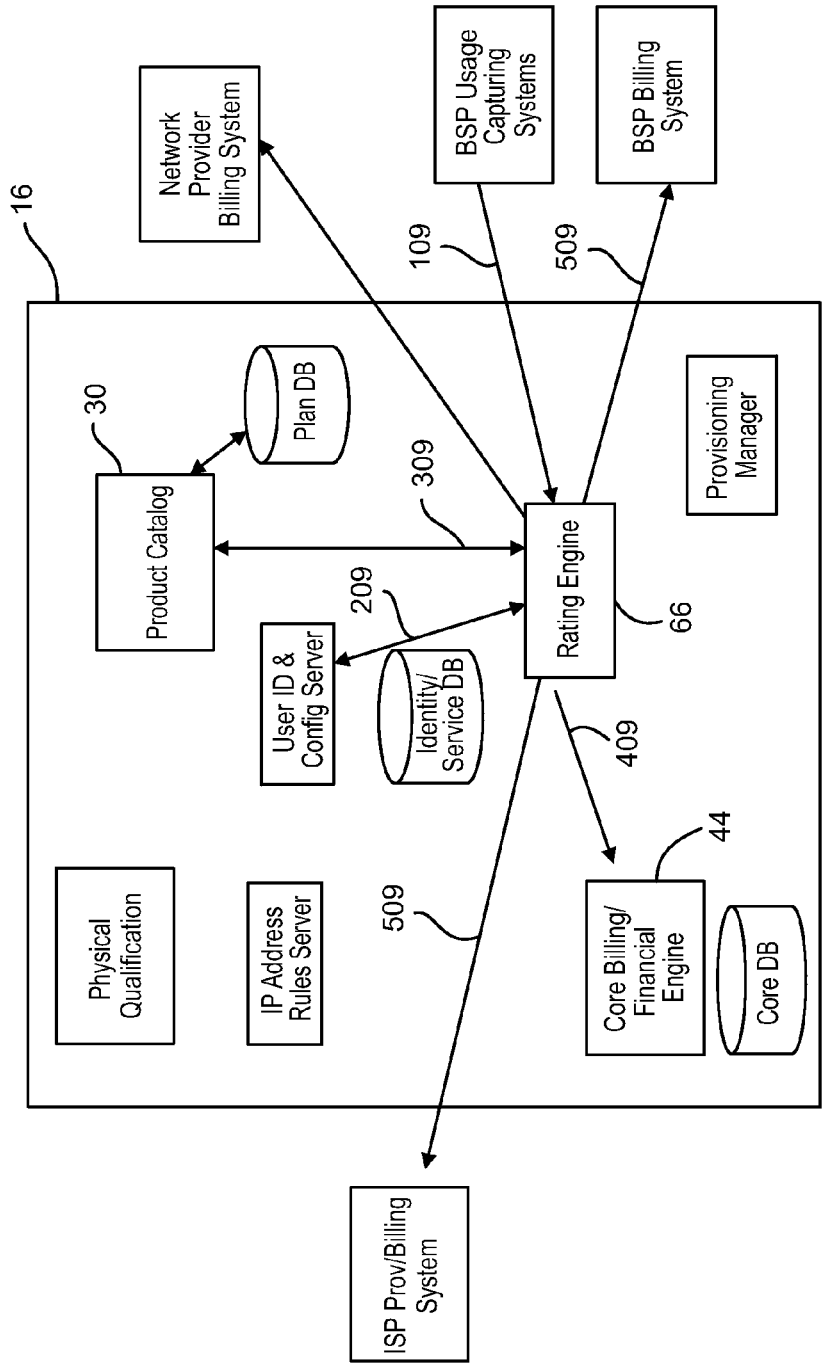
Figure 10:
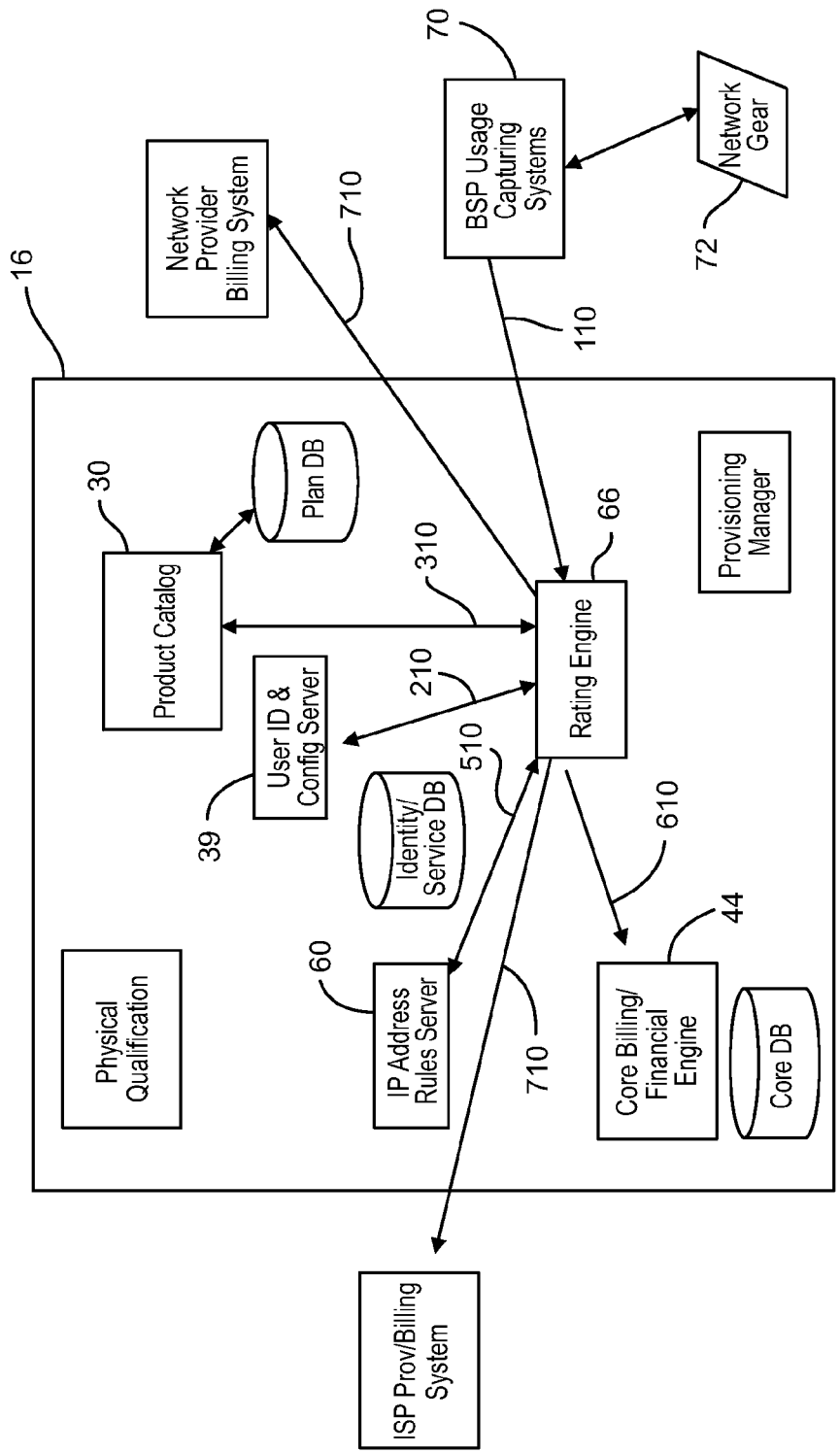
FIG. 10 illustrates an exemplary open access broker system in connection with an exemplary process for performing usage and rating for network usage.

For rating purchases and usage of services, customers purchasing a service from a BSP 12 trigger a rating event that is sent (109) by the BSP 12 to a Rating Engine 66 of the Open Access Broker 16 as illustrated in FIG. 9. The message indicative of the rating event preferably contains the user's identity, the amount purchased, and the service purchased by pre-determined category. The Rating Engine 66 will query (209) the User ID and Configuration Server 39 to determine the master unique id that is associated with this customer. The Rating Engine 66 will then query (309) the Product Catalog 30 for rating guidelines that apply for the service purchased by the customer. After rating the event, the information is passed (409) to a Financial/Billing Engine 44 for further processing. The information may also be passed to the Network Provider and/or the ISP's billing system for the purposes of later reconciliation (509).

When rating network usage, users purchasing a service from a BSP 12 trigger a rating event that is sent (110) by the BSP 12 to the Rating Engine 66 of the Open Access Broker 16. The rating event message may be created in the BSP's Network Mediation System 70 which receives access information from the Network Gear 72. The message indicative of the rating event preferably contains the user's identity, the amount purchased, and the access purchased by pre-determined category. The Rating Engine 66 will query (210) the User ID and Configuration Server 39 to determine the master unique id that is associated with this customer. The Rating Engine 66 will then query (310) the Product Catalog 30 for rating guidelines that apply for the plan selected by the user. A query (510) is made against the IP Address Rules Server 60 to determine if there are any further guidelines that apply to the IP address passed as part of this event. After rating the event, the information is passed (610) to a Financial/Billing Engine 44 for further processing. The information may also be passed to the Network Provider and/or the ISP's billing system for the purposes of later reconciliation (710).

Upon receipt of rating information, the Financial/Billing Engine 44 tracks the financial relationships between customers, their chosen services, and the respective providers. In a simple model with one provider and multiple end customers the billing process is very straightforward. A customer purchases a service and incurs a monthly charge and potentially an initial setup charge for installation and equipment. Customers are assigned account numbers and are segregated by provider and, in some cases, by physical locations in order to calculate franchise fees and taxes. Once per month the rating information received for a customer is combined with a monthly rate and a detailed bill is generated. The customer is either sent a detailed statement or their credit card is billed directly depending on the plan and billing methodologies available and offered. The accounts receivables for the providers are therefore directly related to the customers. The Financial/Billing Engine 44 may also be used to track collections and delinquencies. How this is handled is a business policy issue determined by the providers. Some of the actions that could be taken include multiple dunning notices, disconnections of service and accumulations of late charges.

In a new multi-provider environment the process is not as direct. The services offered create a need to track multiple accounts receivable across providers at a customer detail level as well as at a provider-to-provider level. In a simple example, a customer purchases a basic Internet Access package from ISP A, at a monthly rate of $50 per month for the first 100 GB of total bandwidth used for the month and a $1 per GB charge for additional traffic, with 10 free content downloads per month and $1.00 per download above that amount. The core access service is provided by Cable provider B, the downloads by Provider C, and the ISP services such as email and website hosting by ISP C. The contractual terms agreed upon by all three providers break down the receivables as illustrated in example Table 1 below.

TABLE 1

|  | Access | Bandwitdth | Content | Content Usage |
|---|---|---|---|---|
| Provider A (ISP) | $11.50 | $0.20 | 0.00 | $.15 |
| Provider B (Network) | $37.50 | $0.80 | $.25 | $.10 |
| Provider C (Content) | 0.00 | $0.00 | $.75 | $.75 |

If, in month one, the customer uses a total of 120 GB of bandwidth and downloads content 15 times the total charge to the customer is $75.00, which is collected in this instance by Provider A. Provider A then has an account receivable with the customer for $75.00 but must also recognize the Account Payable they have with Providers B and C, in the amounts of $53.75 and $4.5 respectively.

The Billing/Financial Engine 44, in cooperation with the Product Catalog 30 determines the contractual rules and rates for each service. The bill for each customer may then be calculated as it was in the first example. The Billing/Financial Engine 44, however, performs the additional steps of calculating the total amount owed to provider B and Provider C for each customer, calculating a grand total, and generating an invoice for provider B and C. Still further, the Billing/Financial Engine 44 can be used to calculate the appropriate franchise fees and taxes for the totals apportioned to the network provider(s) or the network provider(s) can use their internal systems to complete this aspect of the billing cycle if they do not use the full Open Access Broker 16 billing engine 44. In the example above the franchise fees and taxes would be calculated for the basic access portion of $37.50 and, if applicable, against the $16.25 charged for bandwidth usage.

Access to the Billing/Financial Engine 44 can be by a standard XML API and GUI tools which enable integration of account management functionality with providers current systems. Using the API/tools a provider can change important customer level information such as credit card numbers, phone numbers, monitor collections and issues credits for service related problems. These same API/tools can be used by a provider to view a detailed invoice at the end customer level in order to reconcile invoices for services issued by the billing engine.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A system for aggregating product offerings from multiple network and service providers and managing the purchase of any offerings by end customers, comprising:

a catalog of offerings available to end subscribers from multiple providers organized into an aggregated plan for presentation to the subscriber, the product catalog tracking rating guidelines and financial reconciliation rules between providers;

a rating engine for processing usage events that originate from providers which usage events summarize data indicative of customer use of offerings across the multiple providers, wherein the rating engine reconciles between the multiple providers based on the rating guidelines and financial reconciliation rules in the product catalog for use in billing the end customer and reconciling payments to the providers; and a provisioning subsystem responsible for provisioning and de-provisioning offerings with the providers, the provisioning subsystem using information in the product catalog to create a series of provisioning events that are relayed to the providers which allow the provider to register a purchase of an offering by the end customer with the provider, track customer usage of the offerings, and, in response to the usage, create usage events for processing by the rating engine.

2. The system as recited in claim 1, comprising a standardized interface to allow providers to develop connections to the product catalog and to transact with other providers.

3. The system as recited in claim 1, comprising an IP address rules server tracking the assignment of IP address subnets across the offerings to thereby provide customer access to the offerings.

* * * * *